(12) United States Patent
Park et al.

(10) Patent No.: US 11,870,325 B2
(45) Date of Patent: Jan. 9, 2024

(54) MOTOR

(71) Applicants: LG INNOTEK CO., LTD., Seoul (KR); Mando Corporation, Pyeongtaek-si (KR)

(72) Inventors: Kyung Sang Park, Seoul (KR); Seong Jin Kim, Seoul (KR); Jung Woo Jo, Seoul (KR); Chang Hyun Park, Seoul (KR)

(73) Assignees: LG INNOTEK CO., LTD., Seoul (KR); MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/155,451

(22) Filed: Jan. 17, 2023

(65) Prior Publication Data
US 2023/0155450 A1     May 18, 2023

Related U.S. Application Data

(63) Continuation of application No. 16/301,216, filed as application No. PCT/KR2017/004811 on May 10, 2017, now Pat. No. 11,588,375.

(30) Foreign Application Priority Data

May 10, 2016    (KR) .................... 10-2016-0056981
Dec. 13, 2016    (KR) .................... 10-2016-0169537

(51) Int. Cl.
    *H02K 3/50*       (2006.01)
    *H02K 7/116*      (2006.01)
    (Continued)

(52) U.S. Cl.
    CPC ............ *H02K 7/1166* (2013.01); *B60T 13/74* (2013.01); *B60T 13/741* (2013.01); *F16H 1/16* (2013.01);
    (Continued)

(58) Field of Classification Search
    CPC ... H02K 3/50; H02K 2203/06; H02K 2203/09
    See application file for complete search history.

(56) References Cited

U.S. PATENT DOCUMENTS

2007/0001525 A1    1/2007   Schneider et al.
2014/0021833 A1    1/2014   Nakai et al.
(Continued)

FOREIGN PATENT DOCUMENTS

CN        204068483 U     12/2014
CN        104467299 A      3/2015
(Continued)

OTHER PUBLICATIONS

Office Action dated Feb. 6, 2020 in Chinese Application No. 201780029013.3.
(Continued)

*Primary Examiner* — Ramon M Barrera
(74) *Attorney, Agent, or Firm* — Saliwanchik, Lloyd & Eisenschenk

(57) ABSTRACT

The present disclosure provides a motor router comprising: an annular body having a first coil guide; and a guide part formed to protrude from the body, and having a second coil guide to which the first coil guide is connected, and thus the present invention reduces the number of parts and has a simplified configuration, thereby providing an advantageous effect of reducing manufacturing processes and manufacturing costs.

10 Claims, 22 Drawing Sheets

(51) Int. Cl.
  *B60T 13/74* (2006.01)
  *F16H 1/16* (2006.01)
  *H02K 3/52* (2006.01)
  *F16H 57/039* (2012.01)
  *F16H 57/02* (2012.01)
(52) U.S. Cl.
  CPC ........... *F16H 57/039* (2013.01); *H02K 3/522* (2013.01); *F16H 2057/02034* (2013.01); *H02K 3/50* (2013.01); *H02K 2203/09* (2013.01)

(56) References Cited

U.S. PATENT DOCUMENTS

| | | | |
|---|---|---|---|
| 2015/0076944 | A1 | 3/2015 | Shim et al. |
| 2016/0111929 | A1 | 4/2016 | Kessler et al. |

FOREIGN PATENT DOCUMENTS

| | | | |
|---|---|---|---|
| CN | 105634171 | A | 6/2016 |
| DE | 10 2010 039 340 | A1 | 2/2012 |
| EP | 2 849 315 | A2 | 3/2015 |
| EP | 2 849 315 | B1 | 11/2017 |
| JP | 2004-350401 | A | 12/2004 |
| JP | 2006-034094 | A | 2/2006 |
| JP | 2006-187175 | A | 7/2006 |
| JP | 2007-209101 | A | 8/2007 |
| JP | 2009-118635 | A | 5/2009 |
| JP | 2009-124926 | A | 6/2009 |
| JP | 2009-290921 | A | 12/2009 |
| JP | 2013-211945 | A | 10/2013 |
| JP | 2014-023255 | A | 2/2014 |
| JP | 2014-87087 | A | 5/2014 |
| JP | 2015-033293 | A | 2/2015 |
| JP | 2015-70632 | A | 4/2015 |
| JP | 2015-097450 | A | 5/2015 |
| JP | 2016-13053 | A | 1/2016 |
| JP | 2016-511625 | A | 4/2016 |
| KR | 10-2015-0031634 | A | 3/2015 |
| WO | 2014/011811 | A1 | 1/2014 |
| WO | 2016/010022 | A1 | 1/2016 |

OTHER PUBLICATIONS

International Search Report in International Application No. PCT/KR2017/004811, filed May 10, 2017.
Office Action dated May 25, 2021 in Japanese Application No. 2018-559193.
Office Action dated Sep. 27, 2022 in Japanese Application No. 2021-137419.
Office Action dated Jul. 9, 2021 in U.S. Appl. No. 16/301,216.
Office Action dated Mar. 16, 2022 in U.S. Appl. No. 16/301,216.
Office Action dated Jun. 9, 2022 in U.S. Appl. No. 16/301,216.
Notice of Allowance dated Oct. 14, 2022 in U.S. Appl. No. 16/301,216.
Office Action dated Apr. 11, 2023 in Japanese Application No. 2021-137419.
Office Action dated Sep. 19, 2023 in Japanese Application No. 2021-137419.
Office Action dated Sep. 20, 2023 in Korean Application No. 10-2016-0056981.

MOTOR

CROSS-REFERENCE TO RELATED APPLICATIONS

This application is a continuation of U.S. application Ser. No. 16/301,216, filed Nov. 13, 2018; which is the U.S. national stage application of International Patent Application No. PCT/KR2017/004811, filed May 10, 2017, which claims the benefit under 35 U.S.C. § 119 of Korean Application Nos. 10-2016-0056981, filed May 10, 2016; and 10-2016-0169537, filed Dec. 13, 2016; the disclosures of each of which are incorporated herein by reference in their entirety.

TECHNICAL FIELD

Embodiments relate to a motor.

BACKGROUND ART

A motor includes a stator and a rotor. The stator may include a stator core and a coil wound around teeth of the stator core. The stator may be composed of a plurality of stator cores. The coil may be wound around each of the stator cores.

In this case, the motor may include a bus bar which is disposed above the stator and connects the coils wound around the stator cores. In this case, a terminal included in the bus bar is fused with and connected to the coil. However, when there are a plurality of stator cores, there are many problems in a fusing process.

Further, when the above described motor is connected to a vehicle component such as a braking device, a power transmitter for transmitting a rotational force of the motor is required. For example, when a direction of power transmission is a vertical direction, a rotational shaft of the motor may be provided with a worm shaft composed of a rotational shaft on which a thread is formed. In addition, a worm wheel which is engaged with the worm shaft may be provided. In this case, there is a problem that a size of the motor is inevitably increased due to a length of the worm shaft and a required diameter of the worm wheel.

Technical Problem

The present invention is directed to providing a motor capable of reducing the number of fusing processes, reducing the number of parts, and reducing a size thereof, and a motor including the same.

The problems to be solved by the embodiments are not limited to the above-mentioned problems, and other problems which are not mentioned herein can be clearly understood by those skilled in the art from the following description.

Technical Solution

One aspect of the present invention provides a motor which includes a body in an annular shape including a first coil guide and a guide part disposed to be protruded from the body and including a second coil guide connected to the first coil guide.

The guide part may be formed to protrude from an upper face of the body in a direction of a rotational shaft passing through a center of the body.

The first coil guide may be concavely disposed in the upper face of the body.

The body may include a through hole passing through the upper face and a lower face thereof and connected to the first coil guide.

A plurality of first coil guides identical to the first coil guide may be formed, and the first coil guides may be disposed on an orbit, which has a different radius, with respect to the center of the body.

The guide part may include, with respect to the center of the body, an inner circumferential surface, an outer circumferential surface, and a side surface connecting the inner circumferential surface and the outer circumferential surface.

The second coil guide may be concavely disposed in the inner circumferential surface of the guide part.

The second coil guide may be concavely disposed in the side surface of the guide part.

The body may include a first body and a second body disposed on the first body, the first body may include a through hole passing through an upper face and a lower face thereof, and the guide part may be disposed on an upper face of the second body to protrude therefrom.

The first coil guide body may be disposed in the outer circumference surface of the guide part concavely in a direction toward the center of the body with respect to a radial direction from the center of the body, and the second coil guide may be disposed in the outer circumferential surface of the guide part concavely in a direction toward the center of the body.

Another aspect of the present invention provides a motor including a rotational shaft, a rotor coupled to the rotational shaft, a stator disposed on an outside of the rotor, and a router disposed above the stator, wherein the router may include a body in an annular shape including a first coil guide and a guide part disposed to protrude from the body and including a second coil guide connected to the first coil guide.

The motor may further include a housing, and the housing may include a first receiving part, a second receiving part and a third receiving part which are disposed to communicate with each other, the rotor, the stator, and a body of the router may be disposed in the first receiving part, the guide part of the router may be disposed in the second receiving part, and the rotational shaft may be disposed in the third receiving part.

Still another aspect of the present invention provides a motor including a rotational shaft, a rotor coupled to the rotational shaft, a stator disposed on an outside of the rotor, and a terminal cover, wherein the terminal cover may include a body part covering an upper portion of the stator and a side part extending downward from the body port, the body part may include a terminal connected to a coil of the stator, and the terminal may be disposed inward of the side part.

The terminal may include a terminal body and a terminal pin formed at an end portion of the terminal body, and the body part may include a hole positioned to allow the terminal pin to be exposed therethrough.

The body part may include a plurality of holes disposed along a circumference thereof.

The plurality of holes may be disposed at regular intervals in a circumferential direction with respect to a center of the body part.

The body part may be divided into a first region portion and a second region portion along a circumference thereof, and a plurality of holes may be disposed in only the first region portion of the first and second region portions.

The terminal body may include a first terminal body and a second terminal body connected to each other, the first terminal body may include the terminal pin, and the second terminal body may be disposed to perpendicularly extend from the first terminal body.

The body part may include a first body and a second body, the first body may include the first terminal body therein, and the second body may be disposed perpendicularly to the first body to include the second terminal body therein.

The second body may be disposed in the first region portion.

Advantageous Effects

According to the embodiment, by omitting a bus bar assembly and directly guiding a coil wound around a stator to a terminal through a change of a method for connecting a wire, the number of components is reduced and the configuration is simplified, whereby advantageous effects of reducing the number of manufacturing processes and manufacturing costs are provided.

According to the embodiment, by omitting the bus bar assembly, a fusing process between the coil wound around the stator and the terminal of the bus bar assembly is not included, and thus an advantageous effect of inherently eliminating defects that can occur in the fusing process is provided.

According to the embodiment, the bus bar is omitted to provide an advantageous effect of reducing a length of an entire motor.

According to the embodiment, by reducing fusing points of the coil and the terminal, an advantageous effect of significantly reducing the number of fusing processes is provided.

MODES OF THE DISCLOSURE

Hereinafter, exemplary embodiments of the present disclosure will be described in detail with reference to the accompanying drawings. Objects, specific advantages, and novel features of the present disclosure will become more apparent from the following detailed description and preferred embodiments related to the accompanying drawings. In addition, the terms and words used in the specification and claims should not be construed to be limited to ordinary or dictionary meanings and should be construed as the meaning and concept consistent with the technical idea of the present disclosure in view of the fact that an inventor should appropriately define the concept of term in order to describe own disclosure in the best way. In addition, in the following description, a detailed description of related arts which may unnecessarily obscure the gist of the present disclosure will be omitted.

Figure 1:
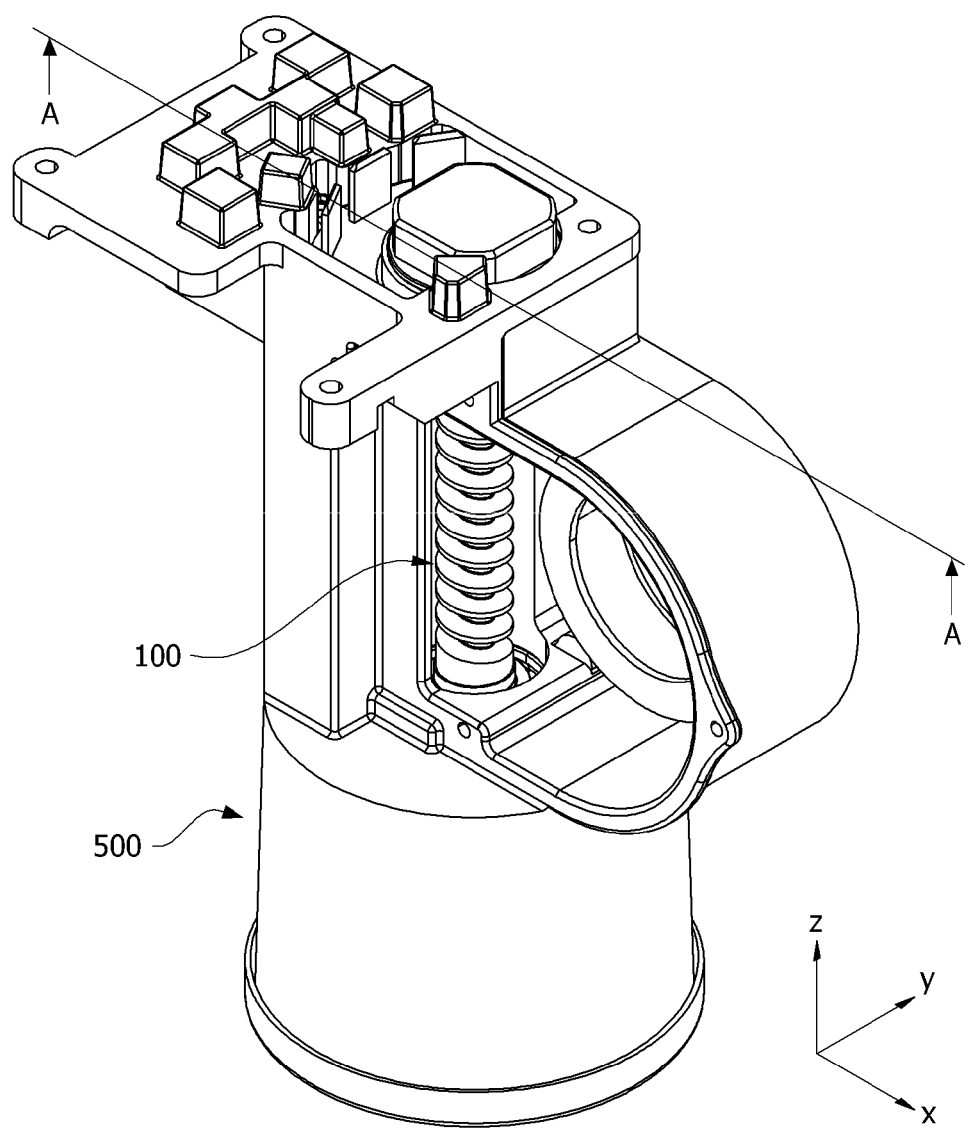
FIG. 1 is a view illustrating a motor according to one embodiment.
Figure 2:
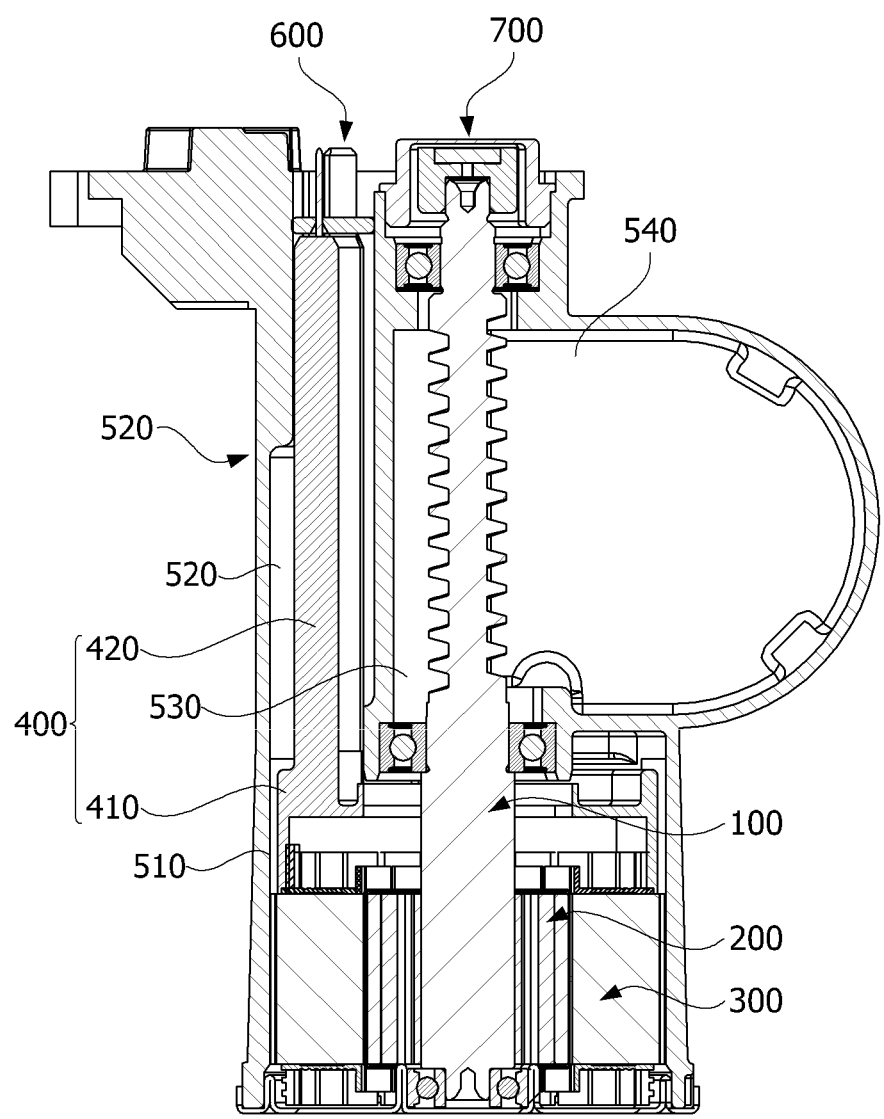
FIG. 2 is a cross-sectional view of the motor taken along line A-A in FIG. 1.

FIG. 1 is a view illustrating a motor according to one embodiment, and FIG. 2 is a cross-sectional view of the motor taken along line A-A in FIG. 1. FIGS. 1 and 2 clearly illustrate only main feature parts in order to conceptually clearly understand the present disclosure, and as a result various variations of the illustrations are to be expected, and there is no need to limit the scope of the present disclosure to the specific configuration illustrated in the drawings.

FIG. 1 is a view illustrating a motor according to one embodiment, and FIG. 2 is a view illustrating a cross-section of the motor taken along line A-A in FIG. 1. FIGS. 1 and 2 clearly illustrate only main feature parts in order to conceptually clearly understand the present disclosure, and as a result various variations of the illustrations are to be expected, and there is no need to limit the scope of the present disclosure to the specific configuration illustrated in the drawings.

Referring to FIGS. 1 and 2, a motor 10 according to the embodiment may include a rotational shaft 100, a rotor 200, a stator 300, a router 400 and a housing 500.

The rotational shaft 100 may have a thread formed on an outer circumferential surface thereof to be implemented as a worm shaft.

The rotor 200 may be disposed inward of the stator 300. The rotor 200 may include a rotor core and a magnet. The rotor 200 may be classified into the following according to a coupling method of the rotor core and the magnet. The rotor 200 may be embodied with a configuration in which the magnet is coupled to an outer circumferential surface of the rotor core. In such a type of the rotor 200, a separate can member may be coupled to the rotor core to inhibit disengagement of the magnet and increase a coupling force. Alternatively, the magnet and the rotor core may be double-injection molded to be integrally formed with each other. The rotor 200 may be embodied with a configuration in which the magnet is coupled to the inside of the rotor core. In such a type of rotor 200, a pocket into which the magnet is inserted may be provided in the rotor core.

On the other hand, the rotor core may be largely classified into two types of rotor cores.

First, the rotor core may be formed by mutually laminating a plurality of plates, each of which is formed in the form of a thin steel plate. In this case, the rotor core may be formed as a single piece that does not form a skew angle, or may be formed by coupling a plurality of unit cores (puck), which form a skew angle.

Second, the rotor core may be formed in the form of one cylinder. In this case, the rotor core may be formed as a single piece that does not form a skew angle, or may be formed by coupling a plurality of unit cores (puck), which form a skew angle, with each other.

Meanwhile, each of the unit cores may include the magnet disposed inward or outward thereof.

The stator 300 is disposed on an outside of the rotor 200. The stator 300 electrically interacts with the rotor 200 to induce rotation of the rotor 200. A coil 1 may be wound around the stator 300 to cause an interaction between the rotor 200 and the stator. A specific configuration of the stator 300 for winding the coil 1 is as follows. The stator 300 may include a stator core including teeth. The stator core is provided with an annular yoke, and the teeth extending from the yoke to a center of the yoke may be provided. The teeth may be provided at regular intervals along a circumference of the yoke. Meanwhile, the stator 300 may be formed by mutually laminating a plurality of plates, each of which is formed in the form of a thin steel plate. Further, the stator core may be formed by coupling or connecting a plurality of divided cores. The coil 1 is wound around the teeth to have magnetic poles, the rotor 200 is rotated by a magnetic field formed by the wound coil 1, and the rotational shaft 100 is simultaneously rotated.

The router 400 is disposed above the stator 300. The router 400 guides the coils 1 wound around the stator 300 to connect the coil to a terminal 600 of a power part located above of the housing 500. In this case, the terminal 600 of the power part may be an element to which a power source with U, V and W phases is connected.

Figure 3:
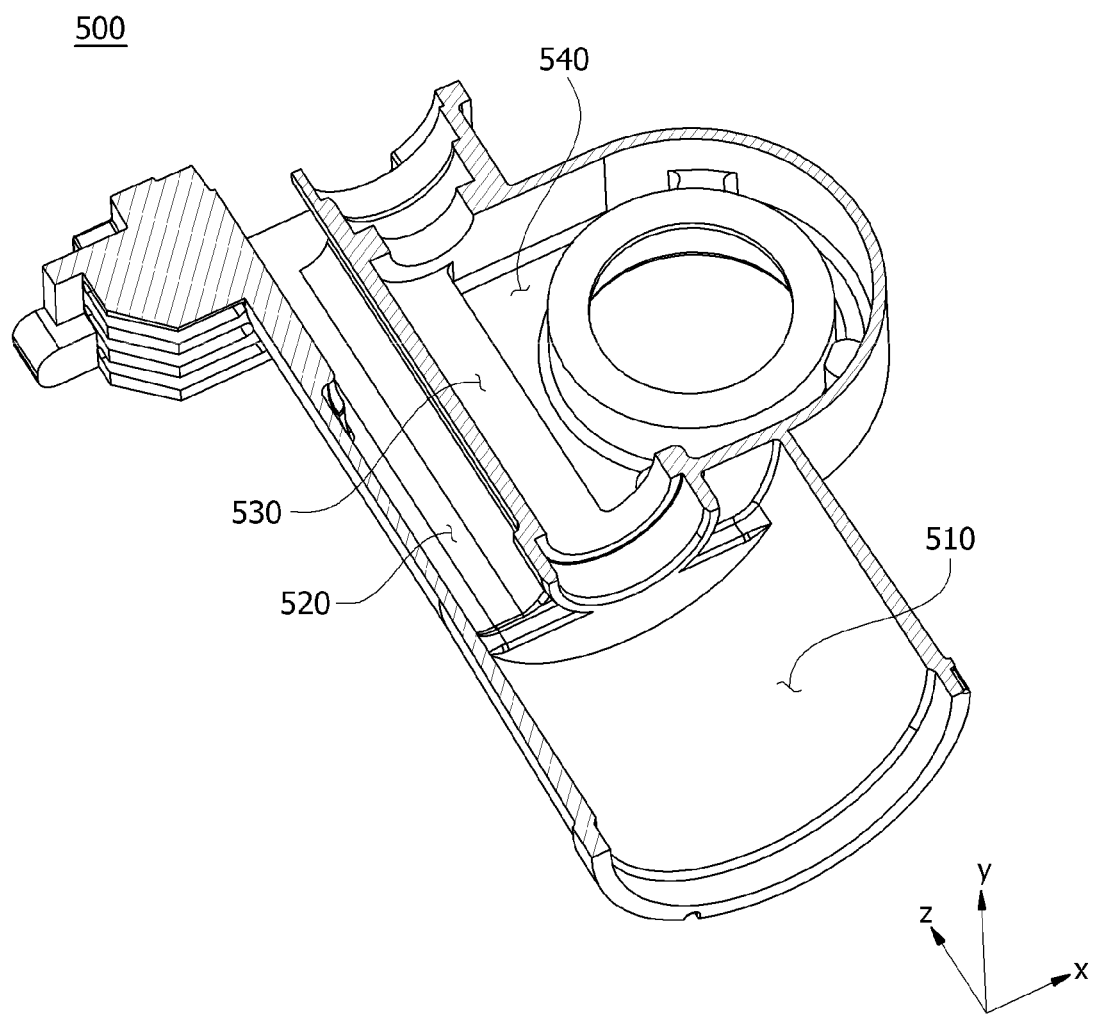
FIG. 3 is a view illustrating the interior of a housing.

FIG. 3 is a view illustrating the interior of the housing.

Referring to FIGS. 2 and 3, the housing 500 may include a first receiving part 510, a second receiving part 520, a third receiving part 530, and a worm wheel receiving part 540.

The first receiving part 510 is disposed at a lower portion of the housing 500 and has an inner space in which the rotor 200, the stator 300, and a body 410 (see FIG. 4) of the router 400 are accommodated.

The second receiving part 520 is disposed to be vertically elongated and has a receiving space for a guide part 420 (see FIG. 4) of the router 400. The second receiving part 520 is configured to communicate with the first receiving part 510 through a lower portion thereof and to have an opened upper portion.

The third receiving part 530 is disposed above the first receiving part 510 and communicates with the first receiving part 510. This third receiving part 530 is disposed to be vertically elongated. The rotational shaft 100 is disposed in the third receiving part 530. An inlet of the third receiving part 530 is connected to the first receiving part 510 and an outlet thereof may be connected to a component of a vehicle, such as a brake device. In addition, the third receiving part 530 is separated from the second receiving part 520. On the other hand, brake oil or lubricating oil of the brake device may flow into the third receiving part 530 via the outlet of the third receiving part 530. To inhibit this, the outlet of the third receiving part 530 may be covered with a sealing cover 700.

The worm wheel receiving part 540 communicates with the third receiving part 530. The worm wheel receiving part 540 has a space for receiving a worm wheel engaging the rotational shaft 100. The worm wheel receiving part 540 may be disposed on one side with respect to the third receiving part 530, and the second receiving part 520 may be disposed on the other side. As one example, the worm wheel receiving part 540 may be located in front of the third receiving part 530, and the second receiving part 520 may be located behind the third receiving part 530.

Figure 4:
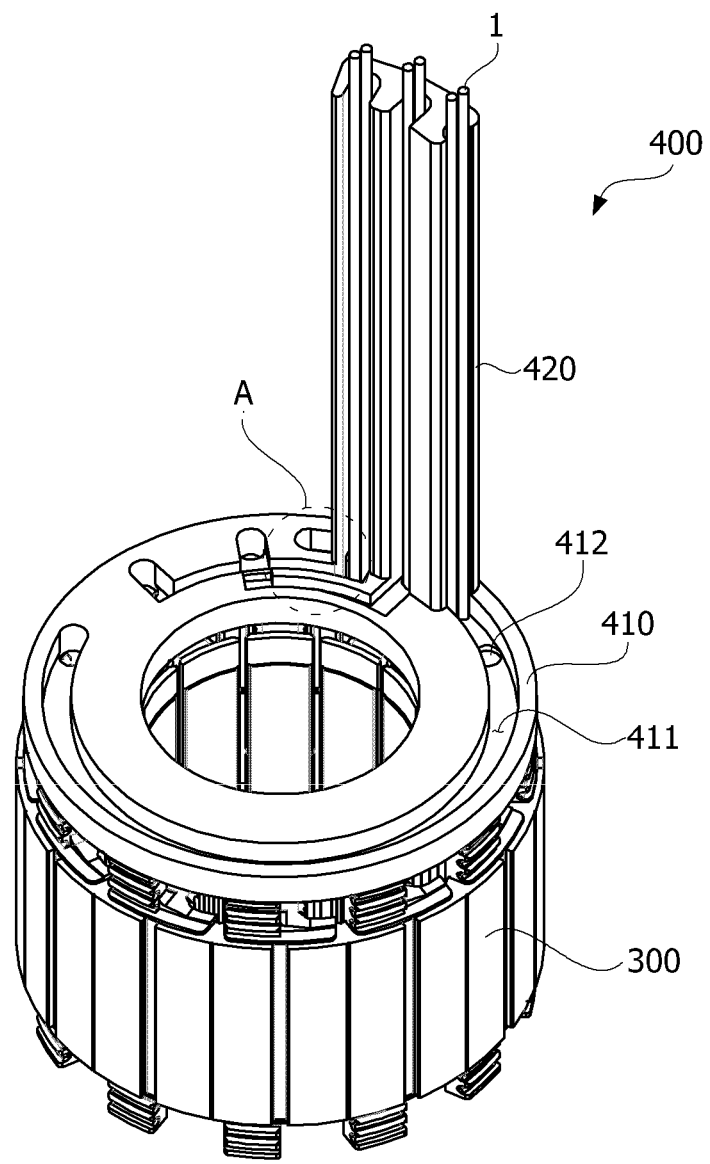
FIG. 4 is a view illustrating a stator including a router according to one embodiment.
Figure 5:
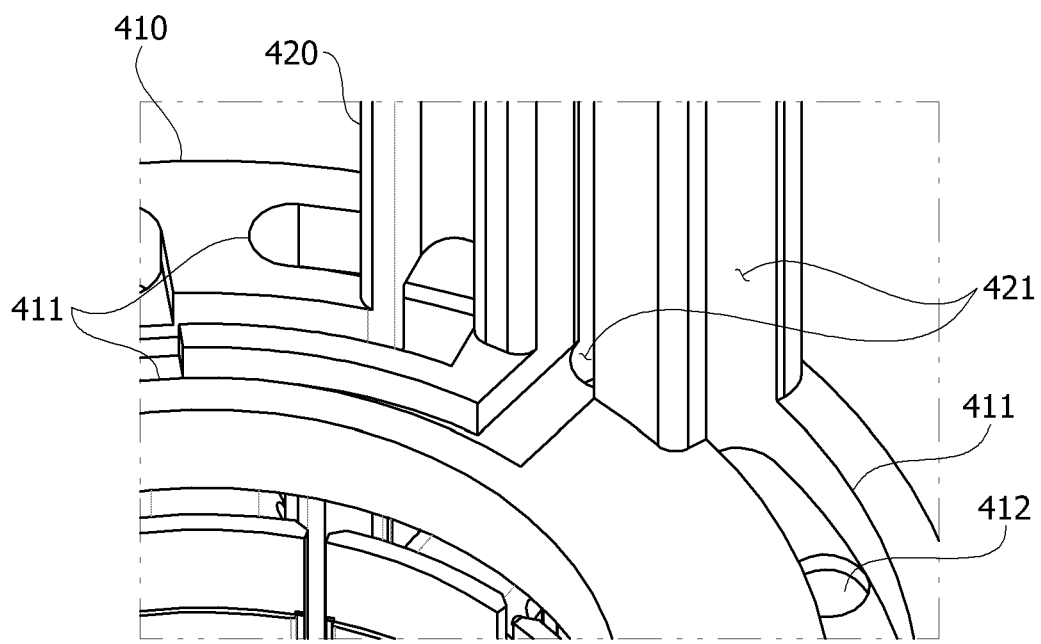
FIG. 5 is an enlarged view of region A in FIG. 4.
Figure 6:
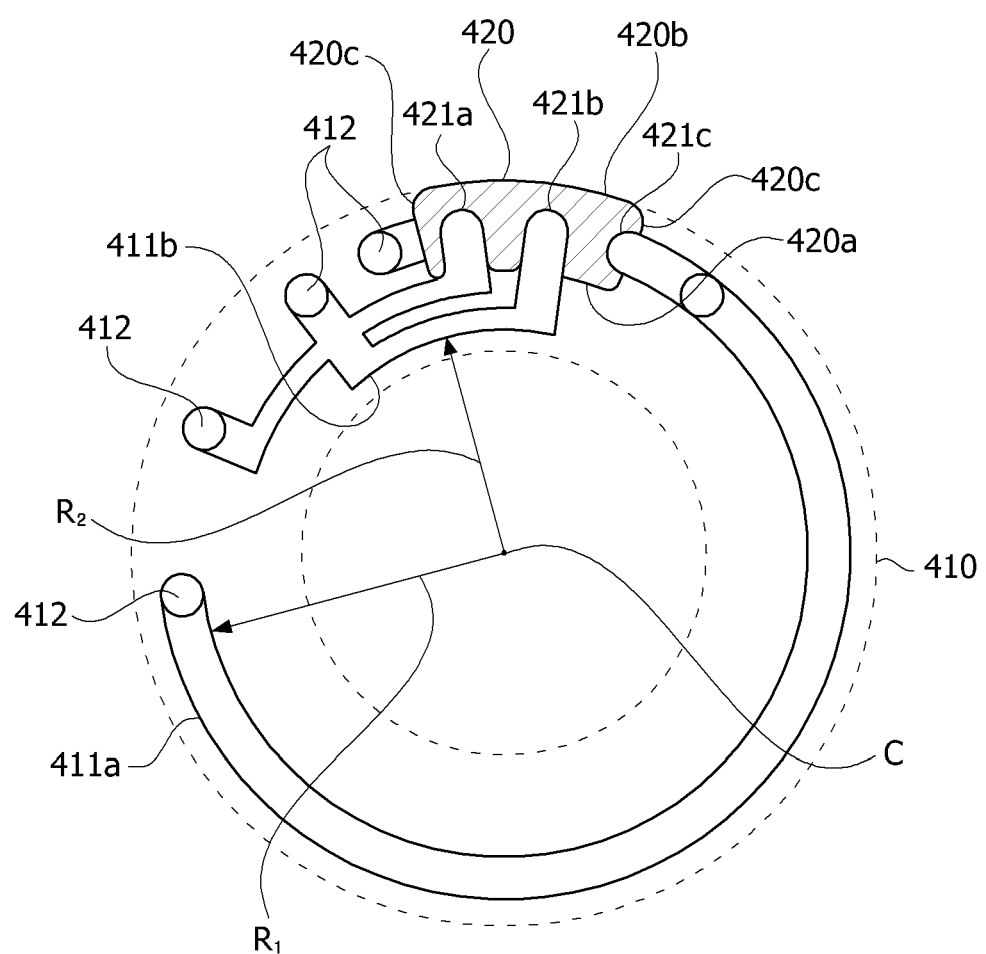
FIG. 6 is a view illustrating a first coil guide and a second coil guide.

FIG. 4 is a view illustrating the stator 300 including the router 400 according to one embodiment, FIG. 5 is an enlarged view of region A in FIG. 4, and FIG. 6 is a view illustrating a first coil guide and a second coil guide.

Referring to FIGS. 4 to 6, the router 400 may be disposed above the stator 300. The router 400 may include an annular body 410 and a guide part 420.

The body 410 may be an annular plate-shaped member having a constant height and having a hole formed in a center thereof. In addition, the body 410 may include a first coil guide 411. The first coil guide 411 serves to guide an extended portion of the coil 1 wound around the stator 300 to the guide part 420. The first coil guide 411 may be concavely disposed in an upper surface of the body 410 to form a space in which the coil 1 is accommodated. The first coil guide 411 is formed to be elongated in a circumferential direction with respect to a center of the router 400 to guide the extended portion of the coil 1, which is rolled around the stator 300, to the guide part 420. To this end, the first coil guide 411 may be disposed to correspond to a position where the extended portion of the coil 1 wound around the stator 300 ascends in a radial direction with respect to a center of the router 400.

A through hole 412 may be formed in the first coil guide 411. The through hole 412 may be formed to pass through the upper surface and a lower surface of the body 410. The coil 1 located below the body 410 passes through the through hole 412 and is positioned in the first coil guide 411. The coil 1 positioned in the first coil guide 411 is guided along the first coil guide 411 and connected to the guide part 420. The number of the through holes 412 may be set according to a method for winding the coil 1.

Referring to FIG. 6, a plurality of first coil guides 411a and 411b may be provided. Each of the first coil guides 411a and 411b may be disposed along a circular orbit, which has a different radius R1, with respect to the center of the router 400. This configuration is provided to cope with a position where the coil 1 ascends or to secure a space for connecting the coil 1 to the second coil guide 421 of the guide part 420.

The guide part 420 may be disposed to protrude perpendicularly to the body 410. That is, the guide part 420 may be disposed to be elongated in a direction of a rotational shaft passing through a center C of the body 410. The above described guide part 420 serves to guide the coil 1, which is guided through the first coil guide 411 of the body 410, to the terminal 600 of the power part located at an upper portion of the housing 500. To this end, the guide part 420 may include a second coil guide 421 connected to the first coil guide 411.

The second coil guide 421 may be disposed to be concave in a surface of the guide part 420. However, the embodiment is not limited thereto, and the second coil guide may be disposed inside the guide part 420.

Meanwhile, the guide part 420 may include a plurality of second coil guides 421a, 421b, and 421c. As one example, the guide part 420 may be implemented to have a shape including an inner circumferential surface 420a, an outer circumferential surface 420b, and a side surface 420c for connecting the inner circumferential surface 420a and the outer circumferential surface 420b. In this case, the second coil guide 421 may be concavely disposed in the inner circumferential surface 420a or the side surface 420c.

Three second coil guides 421*a*, 421*b*, and 421*c* may be provided. The coils 1 of U-phase, V-phase, and W-phase may be accommodated in the second coil guides 421*a*, 421*b*, and 421*c*, respectively. As one example, two second coil guides 421*a* and 421*b* may be disposed on the inner circumferential surface 420*a* of the guide part 420 and the other one second coil guide 421*c* may be disposed on the side surface 420*c* of the guide part 420.

Each of the second coil guides 421*a*, 421*b*, and 421*c* is connected to the first coil guides 411*a* and 411*b*.

The extended portion of the coil 1 wound around the stator 300 passes through the through hole 412 and is then accommodated in the first coil guide 411. The coil 1 accommodated in the first coil guide 411 is guided in a circumferential direction with reference to the center of the router 400 to reach the second coil guide 421 of the guide part 420. The coil 1 accommodated in the second coil guide 421 is guided to the upper portion of the housing 500 to reach the terminal 600 of the power part.

Figure 7:
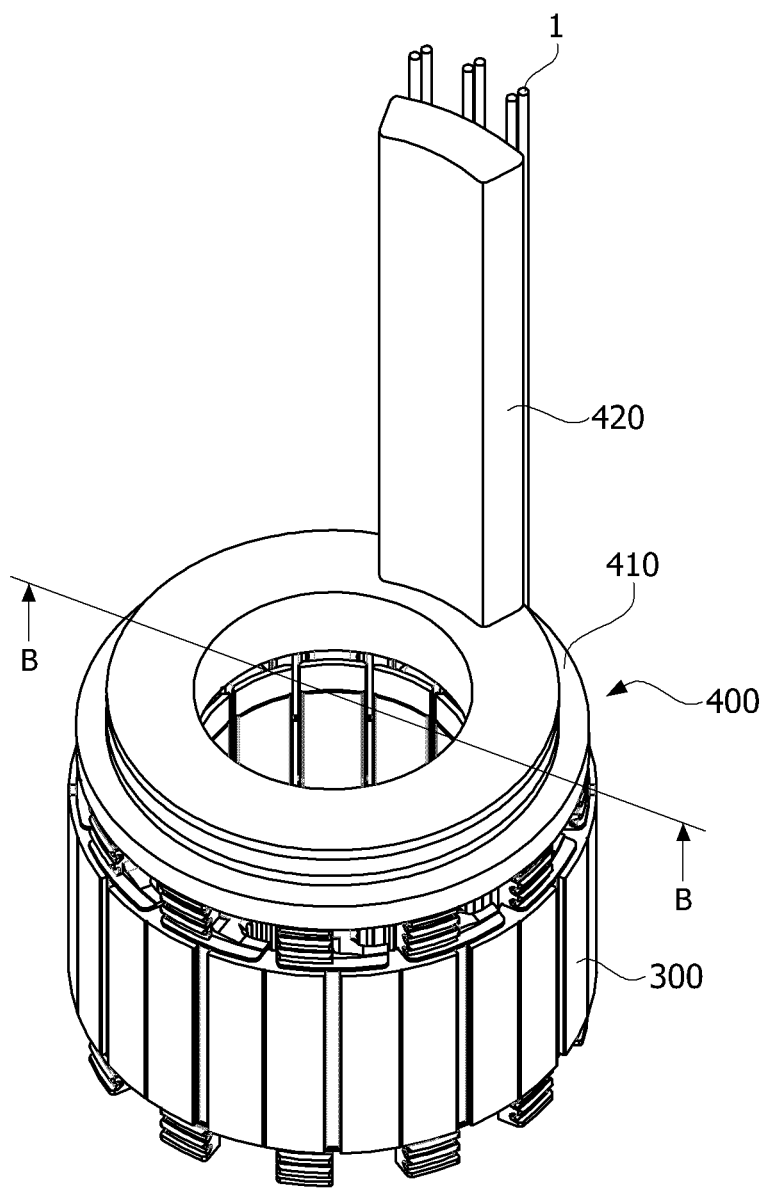
FIG. 7 is a view illustrating a stator including a router according to another embodiment.
Figure 8:
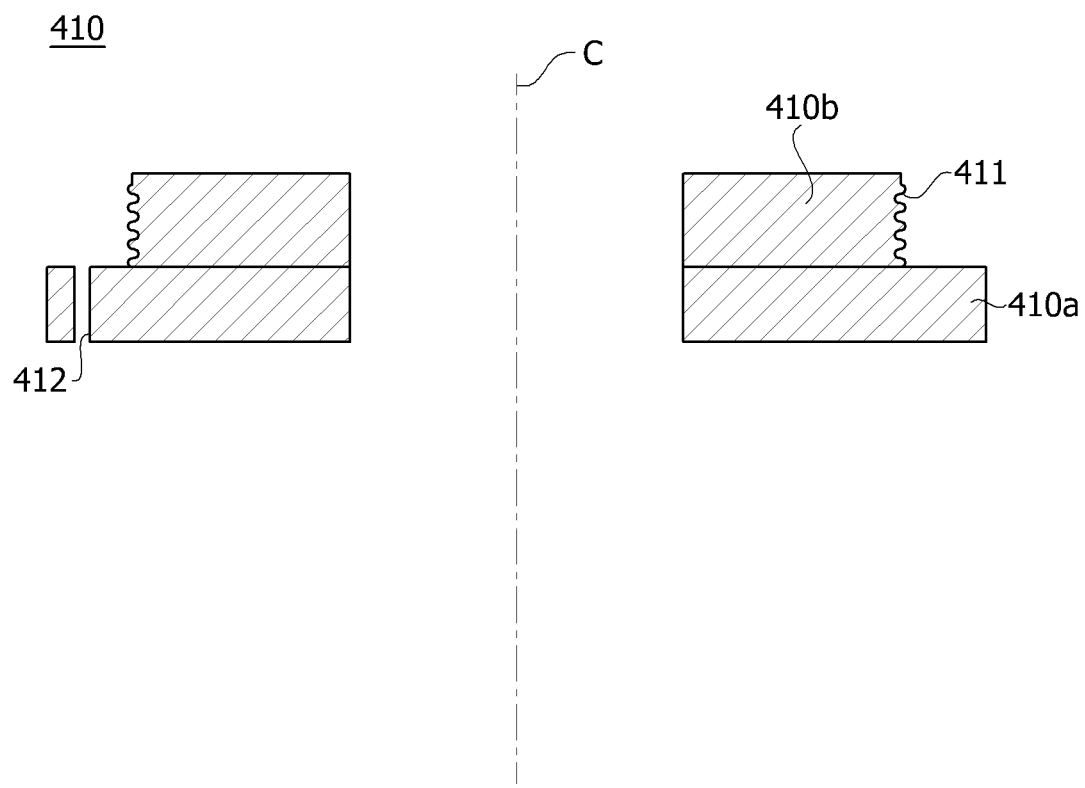
FIG. 8 is a cross-sectional view taken along line B-B in FIG. 7 that shows a first coil guide.
Figure 9:
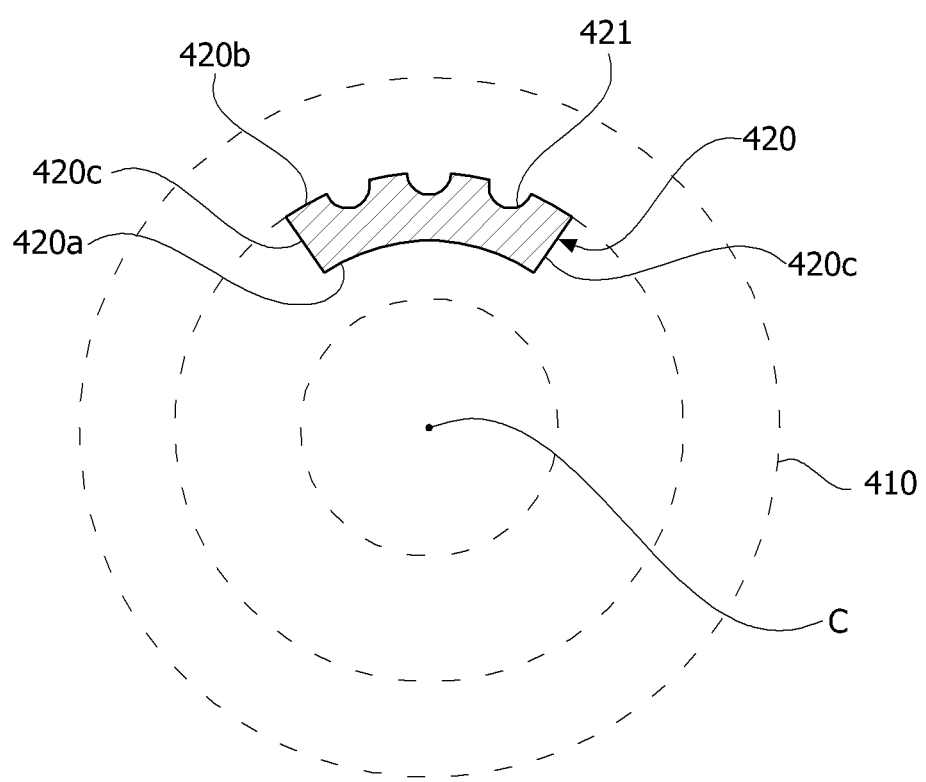
FIG. 9 is a view illustrating a second coil guide.

FIG. 7 is a view illustrating a stator 300 including a router 400 according to another embodiment, FIG. 8 is a cross-sectional view taken along line B-B in FIG. 7 that shows a first coil guide 411, and FIG. 9 is a view illustrating a second coil guide 421.

As another type of router 400, a body 410 may be implemented as an annular plate shaped member having multiple steps with different heights. For example, the body 410 may include a first body 410*a* and a second body 410*b* formed on the first body 410*a*. An outer diameter of the second body 410*b* which is correspondingly disposed on an upper side is smaller than an outer diameter of the first body 410*a*. In addition, the second body 410*b* may include the first coil guide 411 which is concavely disposed in an outer circumferential surface thereof.

The first body 410*a* may include a through hole 412. The through hole 412 is formed to pass through an upper surface and a lower surface of the first body 410*a*.

The guide part 420 may be disposed to protrude perpendicularly to the second body 410*b*. That is, the guide part may be formed to be elongated in a direction of the rotational shaft passing through a center C of the body 410. As one example, the guide part 420 may be implemented to have a shape including an inner circumferential surface 420*a*, an outer circumferential surface 420*b*, and a side surface 420*c* for connecting the inner circumferential surface 420*a* and the outer circumferential surface 420*b*, and all the second coil guides 421 may be disposed on the outer circumferential surface 420*b*.

A coil 1 guided along the outer circumferential surface of the second body 410*b* to the first coil guide 411 is guided to an upper portion of a housing 500 by the second coil guide 421 and then reaches the terminal 600 (see FIG. 2) of the power part.

Figure 10:
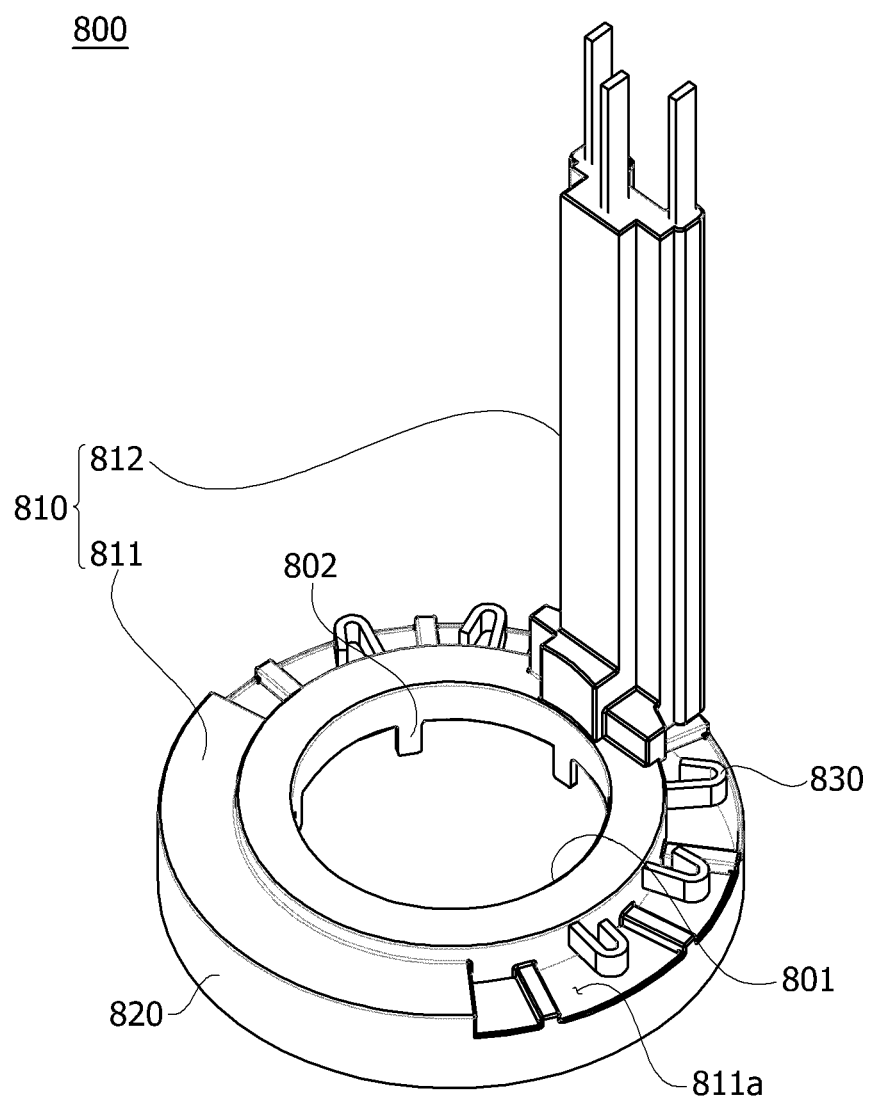
FIG. 10 is a view illustrating a terminal cover applied to a motor according to still another embodiment.

FIG. 10 is a view illustrating a terminal cover applied to a motor according to still another embodiment.

Referring to FIG. 10, a terminal cover 800 replacing the router 400 (see FIG. 4) may be disposed. The terminal cover 800 covers an upper portion and a portion of side surface of a stator 300.

The terminal cover 800 may include a body part 810, a side part 820, and a terminal 830. Here, the body part 810 and the side part 820 may be described as being divided according to their shapes and functional characteristics and may be one part vertically connected to each other.

The body part 810 covers the stator 300. The body part 810 may be an annular member having a hole 801 formed in a center thereof. The hole 801 is a region through which the rotational shaft 100 passes.

The body part 810 may include a first body 811 and a second body 812. The first body 811 is an annular member horizontally disposed above the stator 300, and the second body 812 is a member which is vertically disposed on the first body 811 and disposed to be elongated in a longitudinal direction. The first body 811 and the second body 812 may be connected to each other to be formed as a unitary mold member. Meanwhile, the body part 810 may include a guide 802 protruding from a lower end of the first body 811. The guide 802 is in contact with an insulator 310 of the stator 300 or the coil 1 to support the first body 811. A side part 820 may be formed to extend downward from a periphery of the body part 810.

Figure 11:
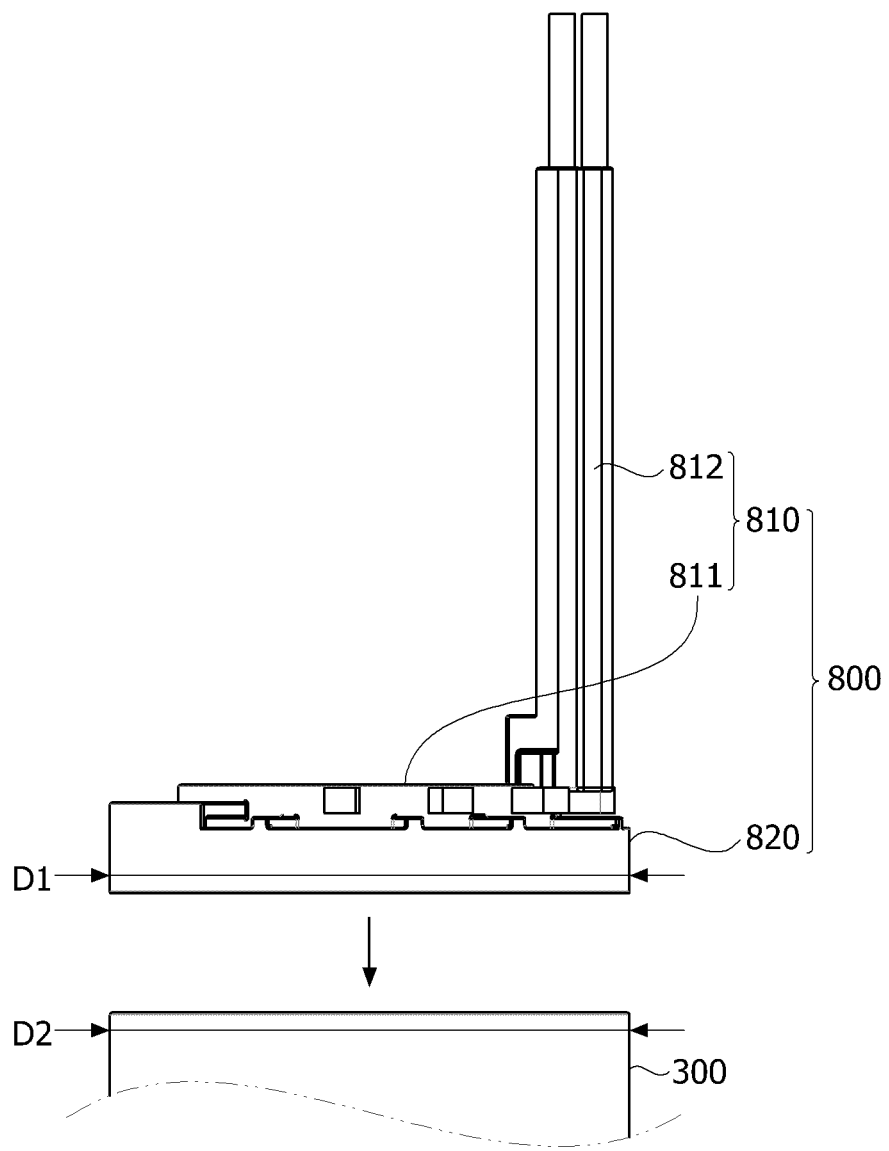
FIG. 11 is a view illustrating an outer diameter of a stator and an outer diameter of the terminal cover.

FIG. 11 is a view illustrating an outer diameter of the stator 300 and an outer diameter of the terminal cover 800.

Referring to FIG. 11, a diameter of the terminal cover 800, that is, an outer diameter D1 of the side part 820 may be equal to an outer diameter D2 of the stator 300. A lower end portion of the side part 820 is in contact with an upper end portion of the stator 300. Specifically, a lower surface end of the side part 820 is in contact with a top surface of the stator 300.

Figure 12:
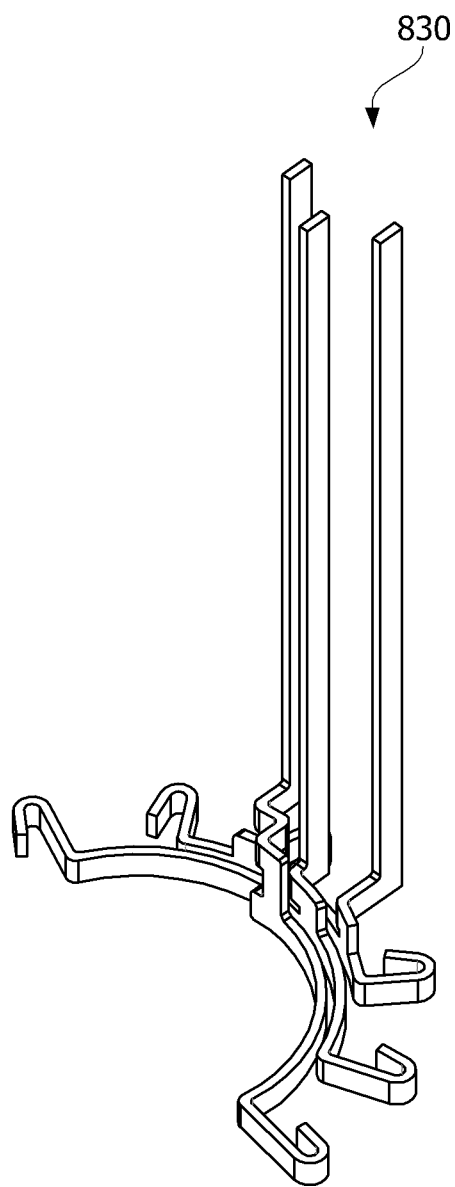
FIG. 12 is a view illustrating a terminal.
Figure 13:
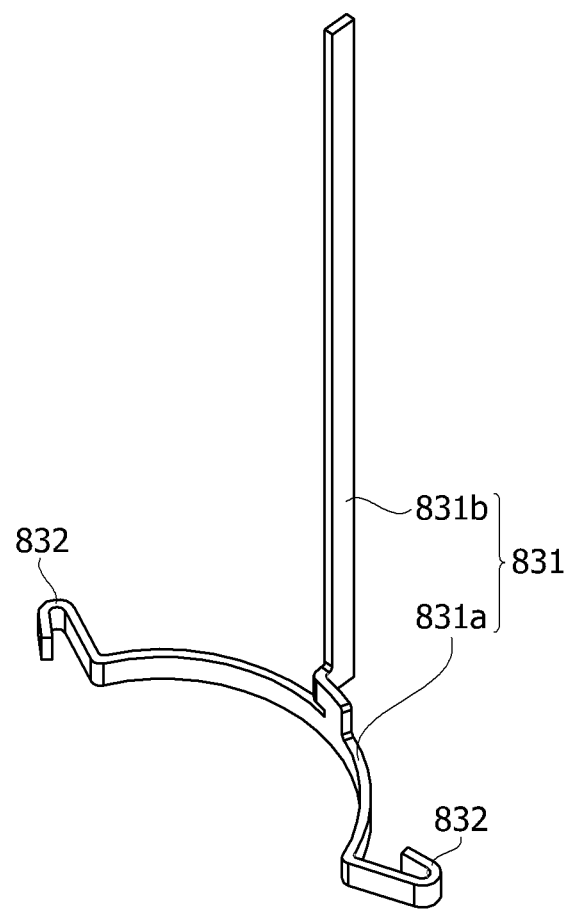
FIGS. 13 to 15 are views illustrating three terminals.
Figure 14:
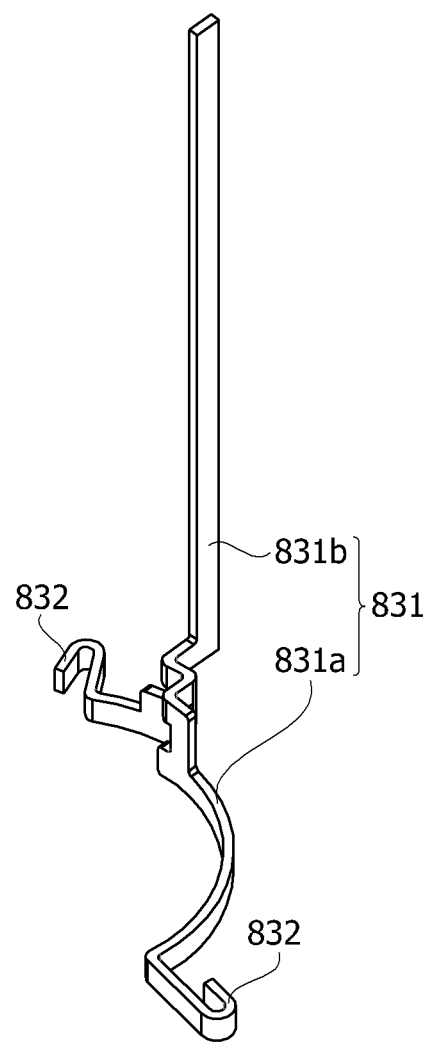
Figure 15:
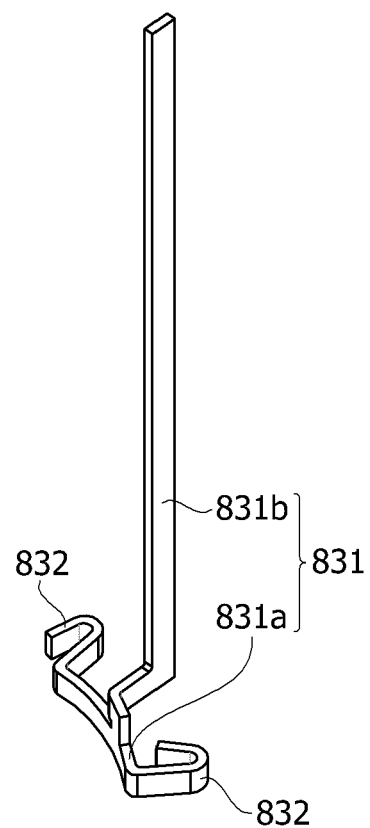

FIG. 12 is a view illustrating the terminal 830, and FIGS. 13 to 15 are views illustrating each of three terminals.

Referring to FIGS. 12 to 15, the terminal 830 may be partially included in the inside of the first body 811. Three terminals 830 of U, V and W phases may be provided. Common features of the three terminals 830 are as follows.

Each of the terminals 830 may include a terminal body 831 and a terminal pin 832.

The terminal body 831 is contained in the first body 811 and the second body 812, and the terminal pin 832 is exposed out of the first body 811.

The terminal body 831 may include a first terminal body 831*a* and a second terminal body 831*b*. The first terminal body 831*a* may be disposed within the first body 811 and the second terminal body 831*b* may be disposed within the second body 812. Here, the first terminal body 831*a* and the second terminal body 831*b* may be described as being divided according to their shapes and functional characteristics and may be one body vertically connected to each other.

Terminal pins 832 may be provided at both ends of the first terminal body 831*a*. The terminal pin 832 may be formed to be bent for being fused with the coil 1 wound around the stator 300. In addition, the first terminal body 831*a* may be formed to be bent in a circumferential direction of the terminal body 831.

The second terminal body 831*b* may be formed to be bent so as to extend vertically from the first terminal body 831*a*.

Figure 16:
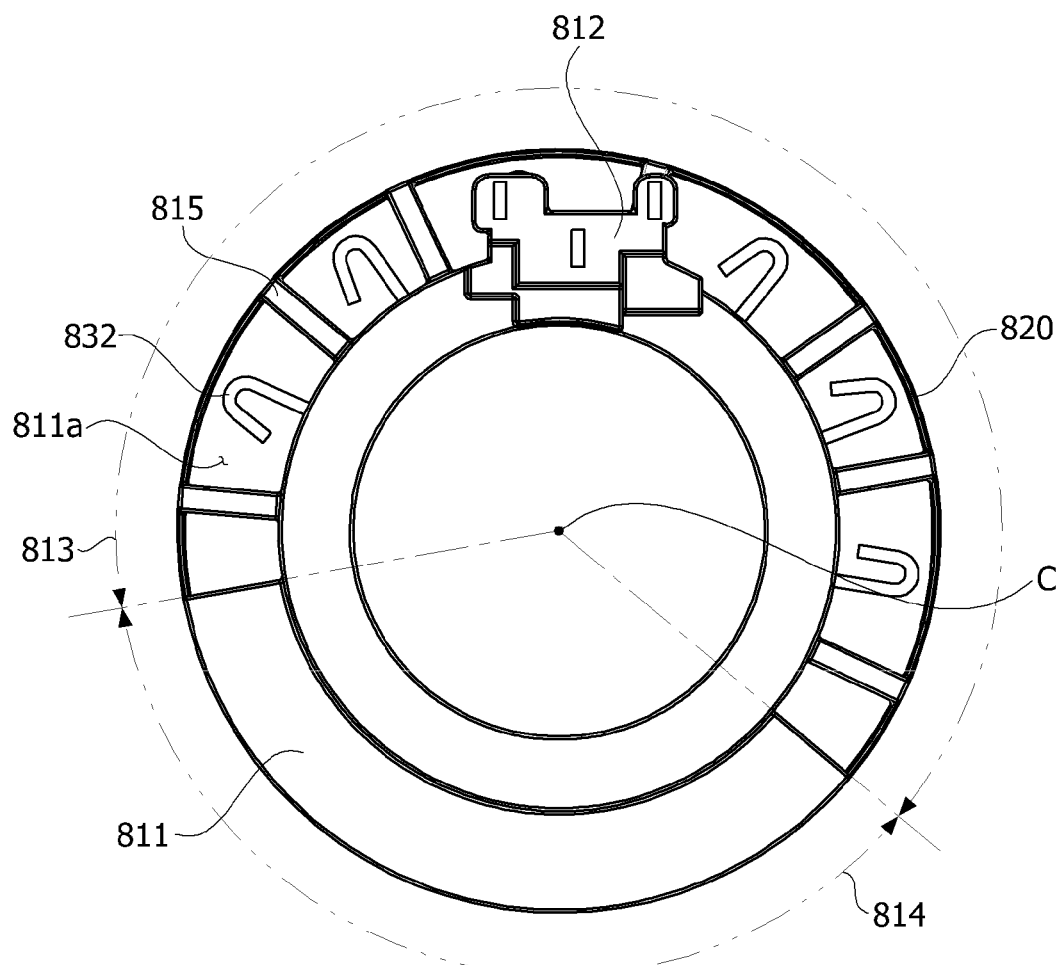
FIG. 16 is a view illustrating a hole of the terminal cover.

FIG. 16 is a view illustrating a hole of the terminal cover.

Referring to FIG. 16, a hole 811*a* through which the terminal pin 832 is exposed may be formed in the first body 811. The plurality of holes 811*a* may be disposed along a circumference of the first body 811. In order to reinforce a structural strength of the plurality of holes 811*a*, a bridge 815 may be disposed between the holes 811*a*. In addition, the holes 811*a* may be provided to be aligned with positions of the terminal pins 832 of the terminal 830.

The coil 1 of the stator 300 passing through the hole 811*a* comes in contact with the terminal pin 832 and is then fused. The first body 811 may be divided into a first region portion 813 and a second region portion 814 depending on whether the hole 811a is formed therein. The first region portion 813 is a portion where the plurality of holes 811a are formed, and the second region portion 814 is a portion where the hole 811a is not formed. The terminal pins 832 of the terminal 830 are disposed in the first region portion 813. The second terminal body 831b which is vertically formed may also be disposed in the first region portion 813.

The terminal pin 832 exposed to the outside of the first body 811 is located inward of the side part 820. Therefore, the side part 820 surrounds the terminal pin 832 to which the coil 1 is fused. In the motor according to the embodiment, the body part 810 and the side part 820 replace a role of a bus bar for covering the stator 300 and connection of the coil 1 at the same time, and therefore it is possible to omit the bus bar. In the motor according to the embodiment, since the bus bar is omitted, a length of the entire motor can be reduced. In addition, since the number of components can be reduced by omitting the bus bar, there is also an advantage that manufacturing costs can be reduced.

In the first region portion 813, as an example, six terminal pins 832 may be arranged. This is a configuration that can be obtained by reducing the number of terminal pins 832 to which the coil 1 is connected. In order to reduce the number of terminal pins 832, a structure of the stator 300 and a winding method may be changed.

Figure 17:
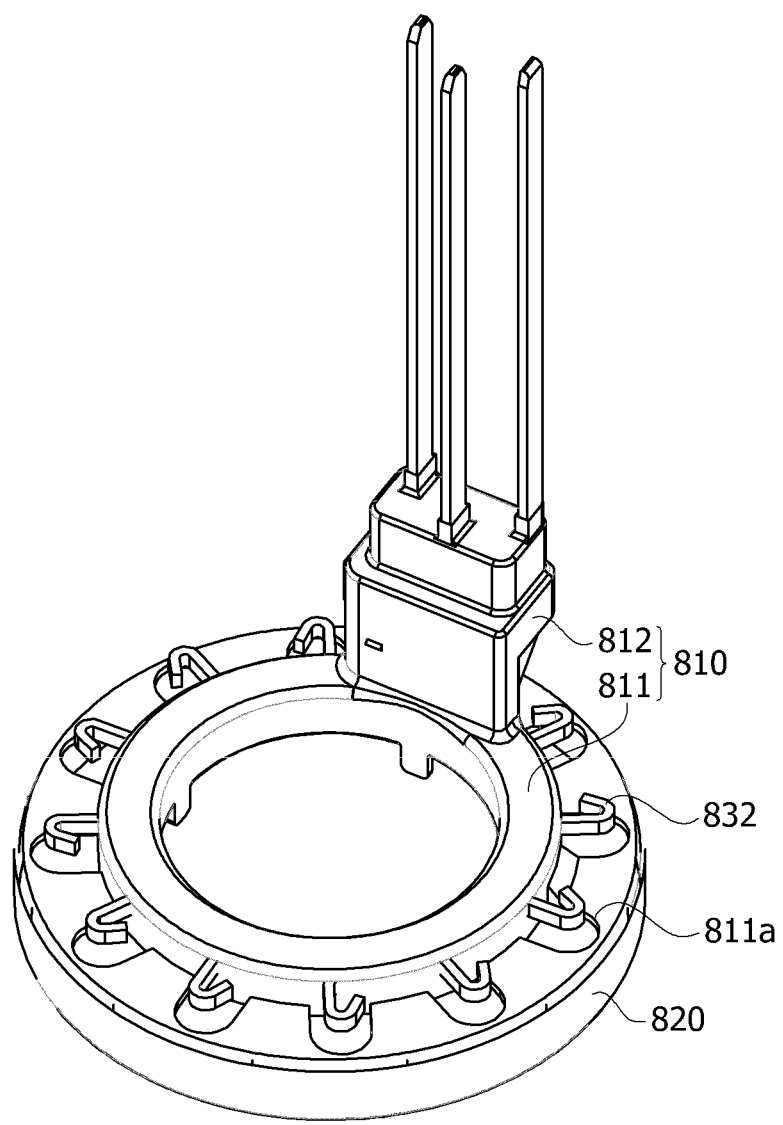
FIG. 17 is a view illustrating a modified example of the terminal cover.
Figure 18:
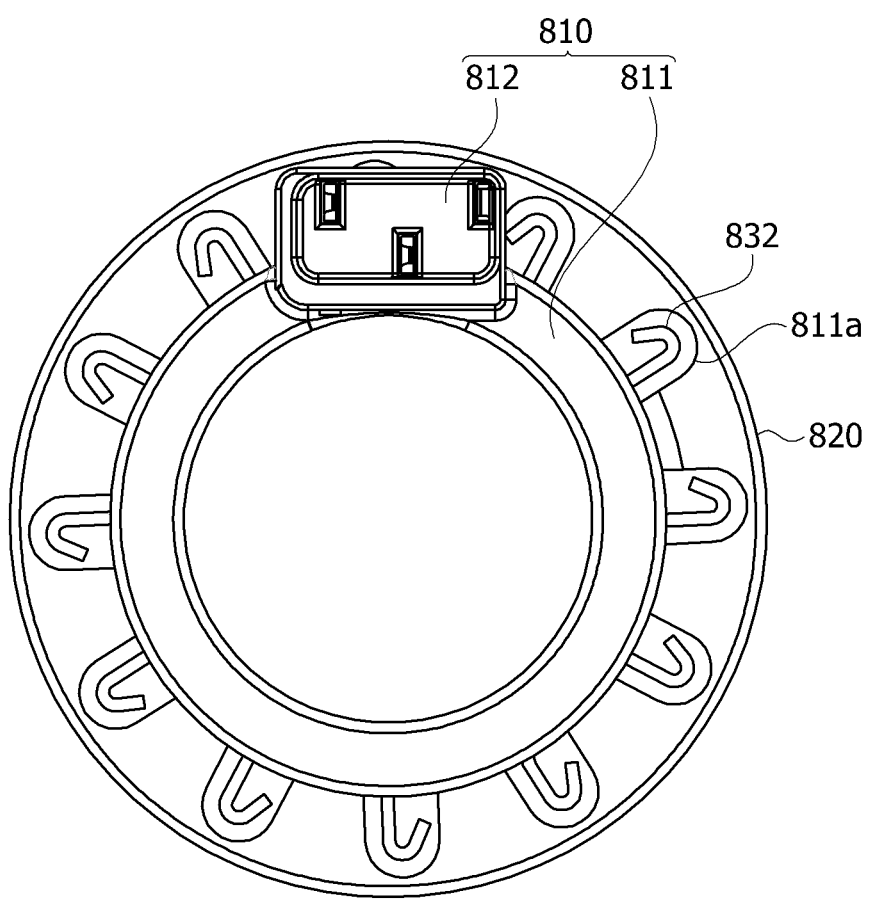
FIG. 18 is a view illustrating a hole of the terminal cover illustrated in FIG. 17.
Figure 19:
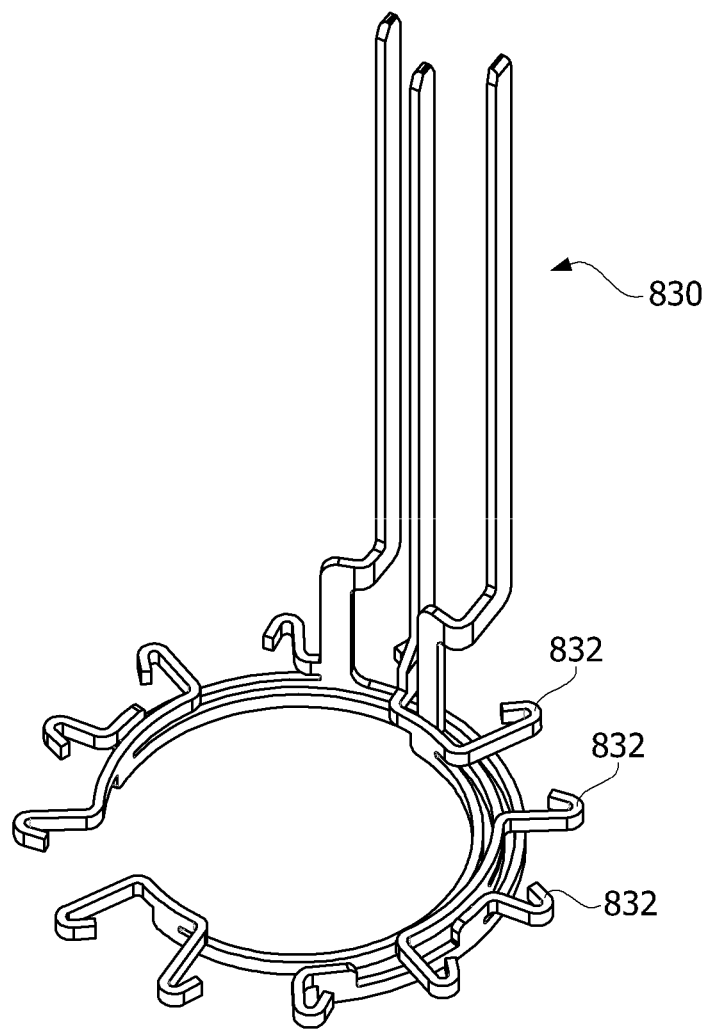
FIG. 19 is a view illustrating a modified example of the terminal.

FIG. 17 is a view illustrating a modified example of the terminal cover, FIG. 18 is a view illustrating the hole of the terminal cover illustrated in FIG. 17, and FIG. 19 is a view illustrating a modified example of the terminal.

Referring to FIGS. 17 and 18, a terminal cover 800 includes a plurality of holes 811a, and the holes 811a may be disposed at regular intervals over an entire first body 811. Specifically, the plurality of holes 811a may be disposed at regular intervals in a circumferential direction with respect to a center of a body part 810.

A position of the hole 811a corresponds to a position of a terminal pin 832. The hole 811a may include a rounded periphery to correspond to a curved shape of a terminal pin 832.

Referring to FIGS. 18 and 19, as a modified example of the terminal 830, three terminals 830 for U, V and W phases are provided, and a total of twelve terminal pins 832 may be disposed.

Figure 20:
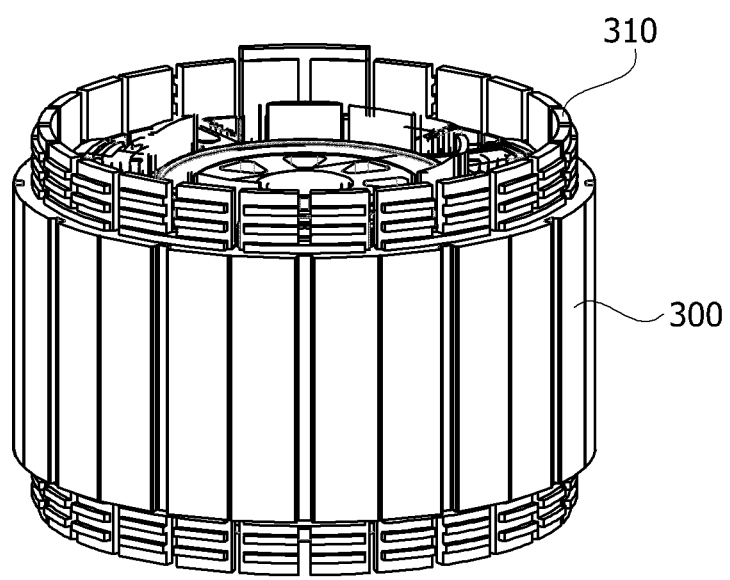
FIG. 20 is a view illustrating the stator including an insulator.
Figure 21:
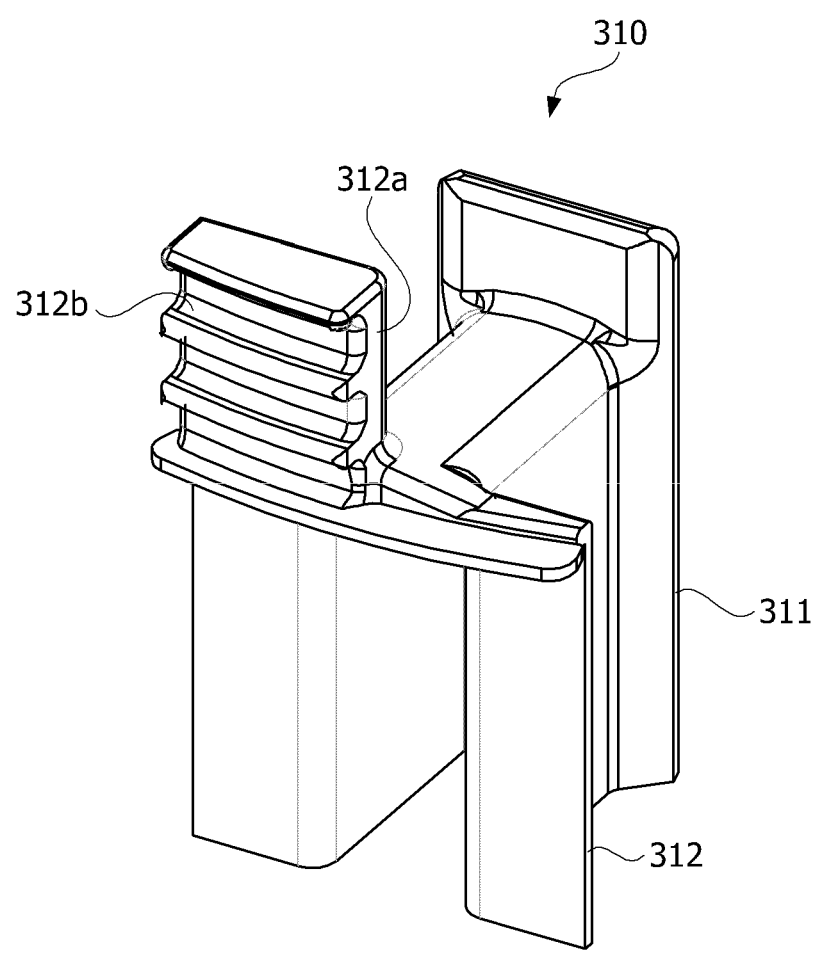
FIG. 21 is a view illustrating the insulator.

FIG. 20 is a view illustrating a stator including an insulator, and FIG. 21 is a view illustrating the insulator.

Referring to FIGS. 20 and 21, a stator 300 of a motor according to the embodiment may be embodied as a deployable stator in which adjacent stator cores are connected to each other. In the deployable stator, stator cores may be unfolded on a plane in the form of a band. When the stator cores are unfolded in the form of a band, an open slot is expanded, so that not only a space factor of the coil 1 is increased, but also it is possible to perform the winding operation for the adjacent stator cores at once. For example, when the winding operation is performed with one coil 1 for two adjacent stator cores, the fusing points can be reduced by half.

In this case, the coil 1 wound around the stator 300 may be guided to be wound around a rear side (outer side) of the insulator 310. Specifically, the insulator 310 may include an inner guide 311 and an outer guide 312. The inner guide 311 and the outer guide 312 serve to inhibit the coil 1 wound around the insulator 310 from being detached. The outer guide 312 includes an extended portion 312a extended upward. In addition, a groove 312b may be formed in the extended portion 312a. The coil 1 wound around the stator 300 may be inserted into the groove 312b, and thus the coil 1 may be guided outward of the insulator 310.

Figure 22:
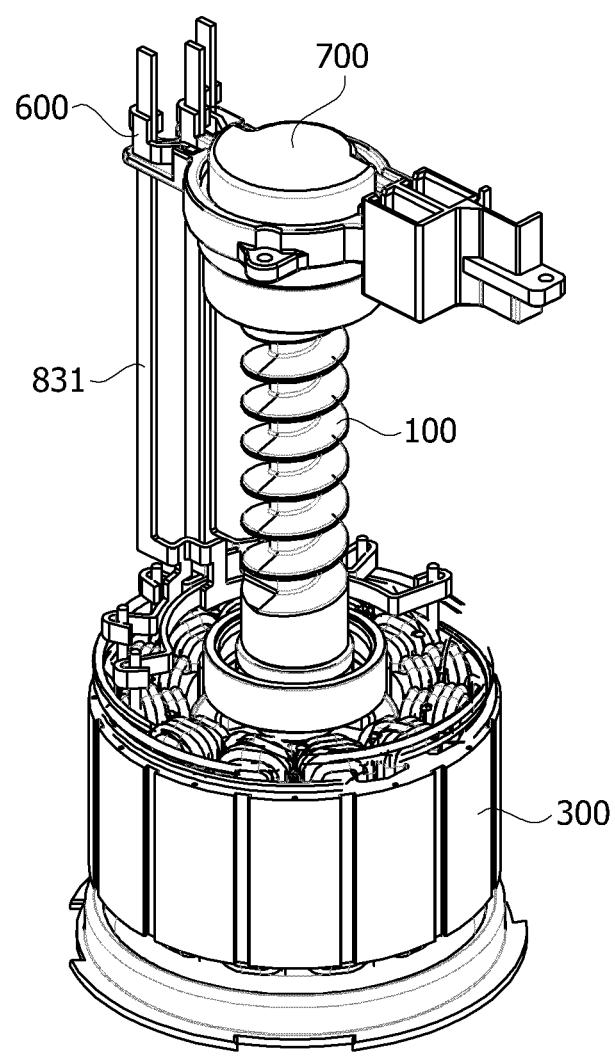
FIG. 22 is a view illustrating the terminal and a sealing cover.

FIG. 22 is a view illustrating a terminal and a sealing cover.

Referring to FIG. 22, a sealing cover 700 may include a terminal 600 of a power part connected to an external power source. A terminal body 831 is disposed to be elongated in an axial direction of the rotational shaft 100 and is connected to the terminal 600 of the power part.

As described above, the router for a motor and the motor including the same according to one exemplary embodiment of the present disclosure have been described in detail with reference to the accompanying drawings.

The above description describes only exemplarily the technical idea of the present disclosure, and those skilled in the art to which the present disclosure pertains may variously modify, change, and substitute the present disclosure without departing from the essential characteristics of the disclosure. Therefore, the embodiments disclosed in the present disclosure and the accompanying drawings are intended to describe rather than limit the technical spirit of the present disclosure, and the scope of the technical idea of the present disclosure is not limited by the embodiments and the accompanying drawings. The scope of protection of the present disclosure should be construed according to the following claims, and all technical ideas within the scope of equivalents thereof should be construed as being included in the scope of the present disclosure.

| [Reference numerals] |
| --- |
| 10: Motor, |
| 100: Rotational shaft |
| 200: Rotor |
| 300: Stator, |
| 400: Router |
| 410: Body |
| 411: First coil guide |
| 420: Guide part |
| 421: Second coil guide |
| 500: Housing |
| 600: Terminal of power part |
| 700: Sealing cover |
| 800: Terminal cover |
| 810: Body part |
| 820: Side part |
| 830: Terminal |

The invention claimed is:

1. A motor comprising:
    a rotational shaft;
    a rotor disposed on an outside of the rotational shaft;
    a stator disposed on an outside of the rotor; and
    a terminal cover,
    wherein the terminal cover comprises a body part and a side part extending downward from the body part,
    wherein the body part comprises a terminal,
    wherein the terminal is disposed closer to the shaft than is the side part,
    wherein the body part comprises a first body part and a second body part,
    wherein the first body part comprises an upper surface and a protruding portion protruded from the upper surface,
    wherein the terminal comprises a plurality of terminal pins disposed outside, in a radial direction of the motor, of the protruding portion of the first body part, and
    wherein the second body part is extended from the protruding portion of the first body part, wherein the second body part is overlapped with at least one of the terminal pins, of the plurality of terminal pins, in a length direction of the shaft.

2. The motor of claim 1, wherein:
the terminal comprises a terminal body; and
the body part comprises a hole positioned to allow the plurality of terminal pins to be exposed therethrough.

3. The motor of claim 2, wherein the body part comprises a plurality of holes disposed along a circumference thereof.

4. The motor of claim 3, wherein the plurality of holes are disposed at regular intervals in a circumferential direction with respect to a center of the body part.

5. The motor of claim 2, wherein the body part is divided into a first region portion and a second region portion along a circumference thereof, and a plurality of holes are disposed in only the first region portion of the first and second region portions.

6. The motor of claim 2, wherein:
the terminal body comprises a first terminal body and a second terminal body connected to each other;
the first terminal body comprises the plurality of terminal pins; and
the second terminal body is disposed to perpendicularly extend from the first terminal body.

7. The motor of claim 6, wherein:
the first body part comprises the first terminal body therein; and
the second body part is disposed perpendicularly to the first body part and comprises the second terminal body therein.

8. The motor of claim 7, wherein the body part is divided into a first region portion and a second region portion along a circumference thereof, and a plurality of holes are disposed in only the first region portion of the first and second region portions, and
wherein the second body part is disposed in the first region portion.

9. The motor of claim 1, wherein the first body part comprises a plurality of holes exposing the plurality of terminal pins, respectively, therethrough, and
wherein the first body part comprises a bridge disposed between two holes of the plurality of holes.

10. The motor of claim 1,
wherein an outer circumferential surface of the first body part, around an entire circumference of the first body part, extends farther outward in the radial direction than each terminal pin of the plurality of terminal pins.

* * * * *